US005158228A

United States Patent [19]

Park

[11] Patent Number: 5,158,228

[45] Date of Patent: Oct. 27, 1992

[54] METHOD FOR ARRANGING PLURALITY OF LINE FILAMENTS ABOVE THE GRID ELECTRODE IN A FLUORESCENT DISPLAYING TUBE

[75] Inventor: Namshin Park, Seoul, Rep. of Korea

[73] Assignee: Samsung Electron Devices Co., Ltd., Kyungki, Rep. of Korea

[21] Appl. No.: 465,355

[22] Filed: Jan. 16, 1990

[30] Foreign Application Priority Data

Jul. 5, 1989 [KR] Rep. of Korea ........ 89-9563

[51] Int. Cl.[5] ........ H01J 9/18; B23K 101/36

[52] U.S. Cl. ........ 228/160; 228/179; 228/214; 445/33

[58] Field of Search ........ 228/160, 179, 189, 214; 445/32, 33, 29

[56] References Cited

U.S. PATENT DOCUMENTS

| | | | |
|---|---|---|---|
| 3,745,620 | 7/1973 | Koy et al. | 445/33 |
| 3,897,614 | 8/1975 | Armstrong | 445/33 |
| 4,666,415 | 5/1987 | Morimoto et al. | 445/33 |

*Primary Examiner*—Sam Heinrich

[57] ABSTRACT

There is disclosed a method for arranging a plurality of line filaments above the grid electrode supported on the base plate of a conventional fluorescent displaying tube. The inventive method employs a temporary mounting plate for temporarily supporting the filaments with tension until they are completely arranged above the grid electrode. The mounting plate comprises a plurality of cutting-off lines and a pair of weld portions at opposite ends thereof. The arrangement of the filaments accomplished, the temporary mounting plate is cut along the cutting-off lines so as to remove all the other portions except the weld portions.

1 Claim, 2 Drawing Sheets

METHOD FOR ARRANGING PLURALITY OF LINE FILAMENTS ABOVE THE GRID ELECTRODE IN A FLUORESCENT DISPLAYING TUBE

BACKGROUND OF THE INVENTION

The present invention concerns a method for arranging a plurality of line filaments above the grid electrode supported on the base plate of a conventional fluorescent tube.

A fluorescent displaying tube, as shown in FIG. 2, comprises a plurality of segmental electrodes A coated with a phophor layer and supported on a base plate B, a grid electrode C above the segmental electrodes A, a filament D above the grid electrode, and a transparent vessel E for containing sealingly all the above elements. The grid electrode C and the filament D are respectively supported by separate supports F and G with a space between them and the other elements. In this case, while the grid electrode C is made of relatively strong material, the filament D comprises a plurality of slender iron wires coated with a carbonate, which must be carefully handled.

Conventionally, the grid electrode C is firstly mounted on the base plate B, and then, a pair of supports G and G' are properly mounted on the base plate B. A plurality of wire filaments D are arranged paralled to each other between said pair of supports G, G' with their ends welded to the supports. During the process, the wire filaments D will be easily bent, and vibrated so as to separate the carbonate thereon. Subsequently, the separated carbonate particles fall on the phosphor layers of the segmental electrodes A through the grid electrode C, thereby impairing the brightness of the phosphor light emitting.

SUMMARY OF THE INVENTION

It is object of the present invention to provide a method for arranging a plurality of line filaments above the grid electrode which does not cause the carbonate to fall due to bending or vibrating of the filaments.

It is another object of the present invention to provide a filament structure for a fluorescent displaying tube more strongly built.

According to the present invention, a method for arranging a plurality of line filaments above the grid electrode supported on the base plate of a conventional fluorescent displaying tube comprises the steps of:

preparing a temporary mounting plate for temporarily supporting the filaments, the mounting plate being rectangular and comprising a plurality of cutting-off lines and a pair of weld portions at opposite ends thereof;

arranging a plurality of filaments on the temporary mounting plate with tension;

welding a pair of weld portions respectively to ends of a pair of supporting plates with the line filaments positioned therebetween;

fixing a pair of supporting plates on the base plate with the other ends thereof attached to the base plate; and cutting the temporary mounting plate along the cutting-off lines so as to remove all the other portions except the weld portions.

The temporary mounting plate must have a thickness not to cause wrinkling thereof. Further, the pattern of the cutting-off lines must be formed so that fragments of the mounting plate may not interfere with the filaments during cutting the plate along the cutting-off lines.

DETAILED DESCRIPTION OF THE INVENTION

The present invention will now be described more specifically with reference to the drawings attached only by way of example.

Figure 1:
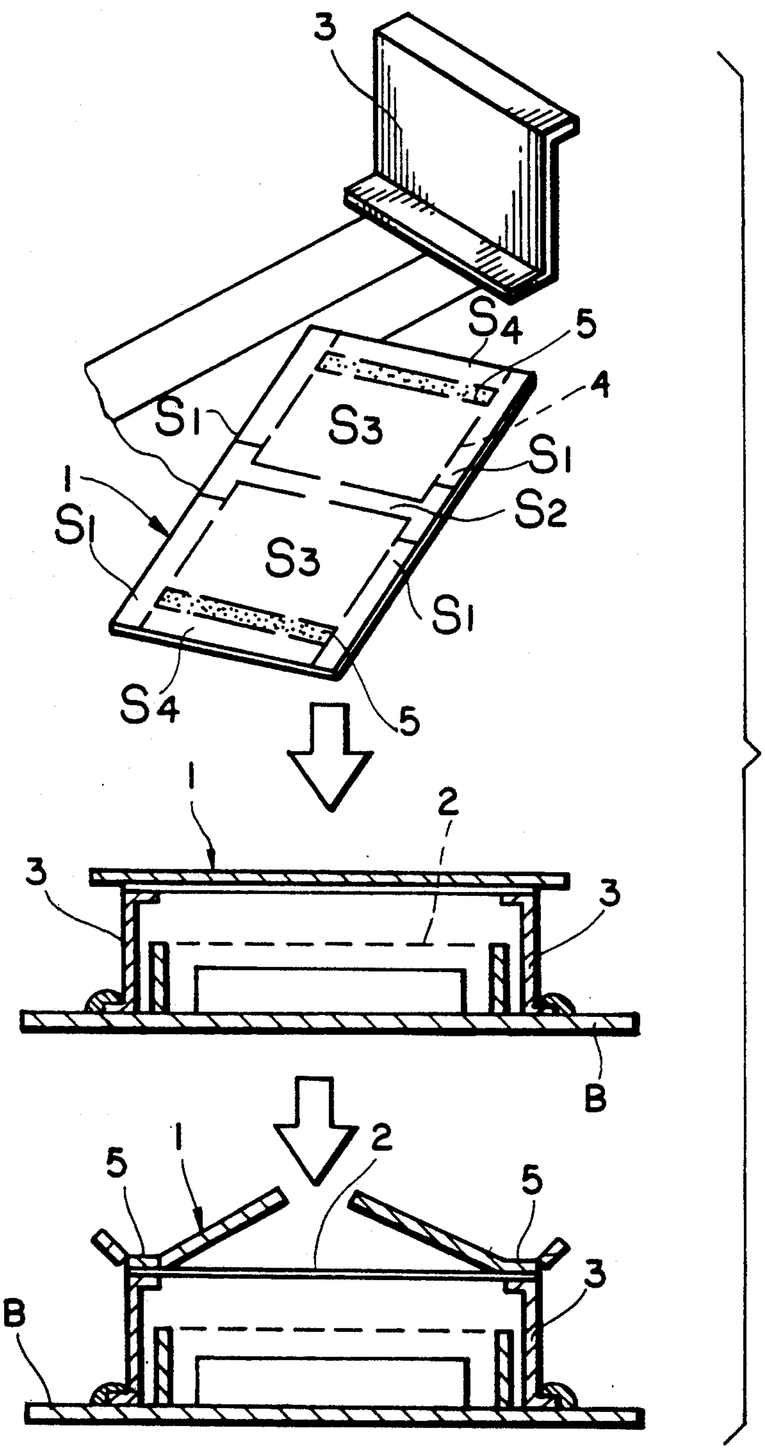
FIG. 1 illustrates the inventive method.
Figure 2:
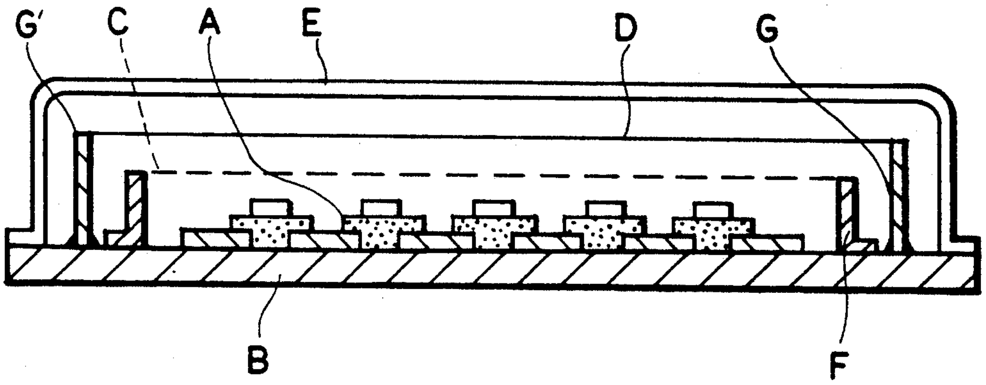
FIG. 2 schematizes a cross-section of a conventional fluorescent displaying tube.

Referring to FIG. 1 for illustrating the steps of the inventive method, the reference numerals 1, 2, and 3 respectively indicate temporary mounting plate, line filament, and supporting plate. The temporary mounting plate 1 is a rectangular thin metal plate having a thickness not to cause wrinkling thereof. The mounting plate 1 includes a pattern of cutting-off lines 4, and a pair of weld portions 5 positioned at opposite ends thereof.

The line filaments 2 are arranged on the mounting plate 1 with tension. The pair of weld portions 5 are spot-welded respectively to ends of a pair of supporting plates 3 with the line filaments positioned therebetween. The other ends of the supporting plates 3 are securely attached to the base plate B. During the process, the temporary mounting plate 1 serves as a jig to support the supporting plates until the supporting plates 3 are fixed to the base plate B, and maintains tensioning of the filaments 2.

After fixing the supporting plates 3 to the base plate, the temporary mounting plate 1 is cut along the cutting-off lines so as to remove all the other portions except the weld portions 5. Using a hand tool such as a pliers, four peripheral segments S1 and then, the central severing portion S2 are removed successively. Thereafter, the remaining segments S3 and S4 are easily removed through their free ends. Hence, it is evident that the filaments 2 are not damaged or vibrated due to the segments S3 during the removing of the temporary mounting plate if a little care is taken.

Thus, the inventive method enables a plurality of line filaments to be handled in one step, and causes the filaments to be arranged properly without bending and vibration thereof during the process, so that the carbonate does not fall on the phosphor layers of the segmental electrodes. Hence, the brightness of the phosphor layers is not deteriorated. Furthermore, the inventive method causes the filaments to be interposed between the supporting plate and the weld portions of the temporary mounting plate, so that the filament structure is more strongly built than the conventional ones.

What is claimed is:

1. A method for arranging a plurality of line filaments above the grid electrode supported on the base plate of a conventional fluorescent displaying tube comprising the steps of:

preparing a temporary mounting plate for temporarily supporting said filaments, said plate being rectangular and comprising a plurality of cutting-off lines and a pair of weld portions at opposite ends thereof;

arranging said plurality of filaments on said temporary mounting plate with tension;

welding said pair of weld portions respectively to ends of a pair of supporting plates with said line filaments positioned therebetween;

fixing said pair of supporting plates on said base plate with the other ends thereof attached to said base plate; and cutting said temporary mounting plate along said cutting-off lines so as to remove all the other portions except said weld portions.

* * * * *